(12) United States Patent
Albrecht

(10) Patent No.: US 8,658,941 B2
(45) Date of Patent: Feb. 25, 2014

(54) WIRELESS SYSTEM CONTROL AND INVENTORY MONITORING FOR WELDING-TYPE DEVICES

(75) Inventor: Bruce Albrecht, Grayslake, IL (US)

(73) Assignee: Illinois Tool Works Inc., Glenview, IL (US)

( * ) Notice: Subject to any disclaimer, the term of this patent is extended or adjusted under 35 U.S.C. 154(b) by 1568 days.

(21) Appl. No.: 11/852,115

(22) Filed: Sep. 7, 2007

(65) Prior Publication Data
US 2008/0061049 A1   Mar. 13, 2008

Related U.S. Application Data

(60) Provisional application No. 60/842,932, filed on Sep. 7, 2006.

(51) Int. Cl.
*B23K 9/10* (2006.01)

(52) U.S. Cl.
USPC ............... 219/137 R; 219/130.1; 219/132; 455/41.1

(58) Field of Classification Search
USPC .............. 219/130.01, 130.1, 137.71, 137 R; 340/539.13, 539.17; 367/124
See application file for complete search history.

(56) References Cited

U.S. PATENT DOCUMENTS

| | | | | |
|---|---|---|---|---|
| 6,797,921 | B1 * | 9/2004 | Niedereder et al. | 219/130.5 |
| 2003/0001726 | A1 * | 1/2003 | Moore | 340/10.3 |
| 2005/0199605 | A1 * | 9/2005 | Furman et al. | 219/132 |

* cited by examiner

*Primary Examiner* — Brian Jennison
(74) *Attorney, Agent, or Firm* — Fletcher Yoder P.C.

(57) ABSTRACT

A welding-type system is designed for wireless control and for inventory monitoring of welding consumables. The welding-type system includes a power source to produce a welding-type power, wherein the power source is operable in a plurality of operating modes. The welding-type system also includes a controller configured to set a plurality of operating parameters within the power source, at least one wireless monitoring device coupled to the controller, and at least one welding-type consumable associated with a wireless transmitter. The wireless transmitter is configured to emit low frequency magnetic signals having consumable data encoded therein that is indicative of the at least one welding-type consumable. The wireless monitoring device is arranged to communicate with the wireless transmitter by receiving and transmitting the low frequency magnetic signals, with the low frequency magnetic signals being transmitted at a frequency of approximately 131 kHz.

23 Claims, 3 Drawing Sheets

US 8,658,941 B2

WIRELESS SYSTEM CONTROL AND INVENTORY MONITORING FOR WELDING-TYPE DEVICES

CROSS-REFERENCE TO RELATED APPLICATIONS

The present application is a non-provisional of, and claims priority to, provisional U.S. Patent Application No. 60/842,932, filed on Sep. 7, 2006.

BACKGROUND OF THE INVENTION

The present invention relates generally to the art of welding and, more particularly, to the monitoring and/or controlling of welding apparatuses and processes based on information gathered and extracted from electronically readable information storage devices encoded with information pertaining to a given welding consumable.

Welding-type systems generally include a power source constructed to generate a welding-type power. The welding-type power is communicated to a torch assembly or a welding gun via a weld cable that extends between the torch and the power source. Numerous interrelated and non-interrelated parameters that affect the welding-type process are controlled by the power source. These parameters, in turn, are at least in part determined by a plurality of consumables that are used during the welding-type process, such as weld wire, shielding gas, and various other consumables. A specific type of consumable can determine an operating mode, as well as numerous parameters within that operating mode, to which the specific consumable is best suited. For example, before carrying out a welding-type process, a user should ensure that a proper welding wire type has been selected as well as ensure that the selected wire has an amperage rating appropriate for the particulars of the welding-type process to be carried out. If the welding-type process particulars and the consumable are not properly matched, damage to the welding-type system and/or a poor-cut quality may result.

In some prior art welding systems, data on consumables to be used in a welding process are transferred wirelessly from the consumable to the welding system. That is, an electronic storage device containing data on the particulars of the consumable (production date, wire diameter, shielding gas type, etc.) is positioned on or in proximity to the consumable or a consumable container, and wirelessly transmits the data to a monitoring device coupled to a controller of the power source. One such device for storing consumable specific knowledge in a welding environment is a radio frequency identification (RFID) tag. The RFID tag is able to store data specific to the consumable and wirelessly transmit that data to a monitoring device to allow for selection of operating modes and welding parameters based on the particulars of the consumable.

While the use of RFID tags in a welding environment allows for wireless communication of consumable information to a welding system, there are several drawbacks and limitations to using RFID tags in a harsh welding environment. That is, the performance of RFID tags is adversely affected in environments where interference is typically encountered. The presence of steel and other metals, which is typical in a welding environment, interferes with the ability of high-frequency, electronic signals to be efficiently transmitted and received by the RFID tags. Because conventional high frequency (13.56 MHz) and ultra-high frequency (916 MHz) RFID tags primarily use the radio portion of electromagnetic induction to transmit a signal, the wireless electronic signals used for communication by RFID tags is particularly susceptible to this interference. Additionally, because of the high frequencies associated with RFID communication, active RFID tags consume a great deal of energy. When used in conjunction with welding consumables that may be stored for extensive periods of time before use, an RFID tag with a short active life span would be highly undesirable.

As such, a need exists for an electronically readable information storage devices from which information can be gathered and extracted, and for a medium by which data signals can be dependably transferred in a harsh, welding environment, such that the monitoring and controlling of welding apparatuses and processes can be efficiently performed. Additionally, a need exists for an electronically readable information storage device that remains in a powered state for a long period of time.

BRIEF DESCRIPTION OF THE INVENTION

The present invention provides a system and method for wireless monitoring and/or controlling of welding apparatuses and processes that overcomes the aforementioned drawbacks. Consumable data is gathered and extracted from electronically readable information storage devices encoded with information pertaining to the consumable and wirelessly transmits that data via a dependable and efficient medium. The electronically readable information storage devices are durable and are able to remain in an operable condition for an extended period of time.

In accordance with one aspect of the present invention, a welding-type system includes a power source to produce a welding-type power, the power source being operable in a plurality of operating modes. The welding-type system also includes a controller configured to set a plurality of operating parameters within the power source, at least one wireless monitoring device coupled to the controller, and at least one welding-type consumable associated with a wireless transmitter, the wireless transmitter configured to emit low frequency magnetic signals having consumable data encoded therein indicative of the at least one welding-type consumable. The at least one wireless monitoring device is arranged to communicate with the wireless transmitter by receiving and transmitting the low frequency magnetic signals, with the low frequency magnetic signals being transmitted at a frequency of approximately 131 kHz.

In accordance with another aspect of the present invention, a wireless communication welding-type system includes a power source to produce a welding-type power, a controller configured to set a plurality of operating parameters within the power source, and at least one wireless monitoring device coupled to the controller. The wireless communication welding-type system also includes a wireless transceiver tag in communication with the at least one wireless monitoring device, the wireless transceiver tag associated with a welding-type consumable and configured to communicate with the at least one wireless monitoring device by way of a bidirectional, on-demand, peer-to-peer protocol transmitted via substantially magnetic waves emitted at a frequency of approximately 131 kHz. The protocol includes consumable data encoded therein indicative of the welding-type consumable.

In accordance with yet another aspect of the present invention, a method for controlling a welding-type process having a plurality of operating conditions includes the steps of providing a consumable to be used in a welding-type process and positioning a wireless tag in proximity to the consumable and associating the wireless tag with the consumable, the wireless tag having a memory to store consumable data regarding parameters of the consumable. The method also includes the steps of reading the consumable data from the wireless tag from a wireless monitoring device, transmitting the consumable data from the wireless tag to the wireless monitoring device by way of a low frequency magnetic signal transmitted at a frequency of approximately 131 kHz, and controlling a welding-type device by setting the plurality of operating parameters, the setting of the plurality of operating parameters being determined by the transmitted consumable data.

In accordance with a further aspect of the present invention, a method for monitoring an inventory of consumables in conjunction with performing a welding-type process includes the steps of providing a consumable to be used in a welding-type process and positioning a wireless tag in proximity to the consumable and associating the wireless tag with the consumable, the wireless tag having a memory to store data on an available quantity of the consumable. The method also includes the steps of measuring the quantity of consumable consumption during performance of the welding-type process, electronically modifying the memory of the wireless tag to reflect an updated available quantity of the consumable, and transmitting a data signal to a wireless monitoring device on an on-demand basis. The data signal includes data therein on the updated available quantity of the consumable and substantially comprises magnetic waves being transmitted at a frequency of approximately 131 kHz.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

As one skilled in the art will fully appreciate, the hereinafter description of welders, welding accessories, welding devices, and welding systems also applies to the constituents of any system that requires high power outputs, such as heating and cutting systems. That is, the present invention is equivalently applicable with any device requiring high power output, including welders, plasma cutters, induction heaters, aircraft ground power units, and the like, as well as accessories and components thereof. Reference to welding power, welding-type power, welding-type processes, or welders generally, includes welding, cutting, heating power, or ground power for aircraft. Description of a welding apparatus illustrates just one embodiment in which the present invention may be implemented.

In addition, it will be understood that the present invention is applicable to a multitude of welding-type devices, accessories, consumables, and the various containers thereof. Not only is the present invention particularly useful in providing for wireless communication with a welding-type power source, the present invention also finds utility when extended to include other components of a welding-type apparatus. Wire feeders, generators, weld guns and torches, advanced and user-adapted systems, and other accessories are all capable of being incorporated with the present invention. The phrase "welding-type device" shall include all devices useable in a welding system, including but not limited to welders, power sources, wire feeders, generators, weld guns and torches, advanced and user adapted systems, other device accessories, and the like.

Figure 1:
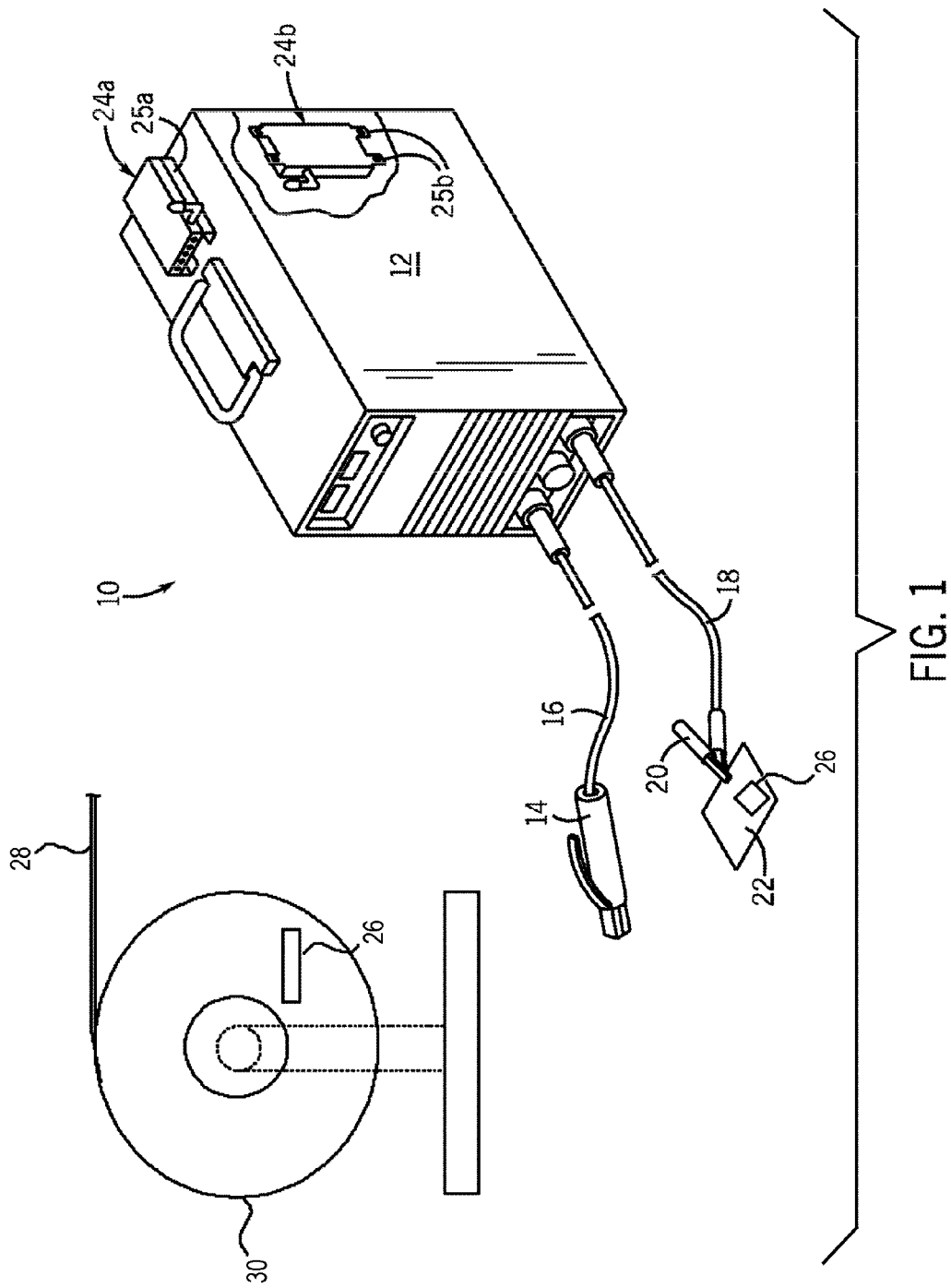
FIG. 1 is a perspective view of a welding-type apparatus in accordance with the present invention.

Referring to FIG. 1, a welding apparatus 10, in accordance with the present invention, is shown. As depicted, welding apparatus 10 includes a welding-type device such as a power source 12, although the present invention is not limited to welding-type power sources. Power source 12 is preferably constructed to receive an input power and generate an output suitable for welding. A torch 14 is operably connected to power source 12 via weld cable 16. Ground cable 18 attaches clamping member 20 to power source 12. Clamping member 20 is constructed to removably secure cable 18 to workpiece 22 so that a desired welding application may be performed. Wireless monitoring device 24 can be seen in break away view, 24b, attached inside power source 12 or optionally attached atop, 24a, an outer surface of power source 12. The desired position of wireless monitoring device 24 will depend upon the type of welding-type apparatus 10, the desired mode of wireless communication, and other design considerations. In the present invention, wireless monitoring device 24 operates as a low frequency, magnetic signal-based communication device. Wireless monitoring device 24a may be positioned outside power source 12 for increased range and better reception, or alternatively, in a preferred embodiment, wireless monitoring device 24b is disposed inside the housing of power source 12 for increased durability.

Wireless monitoring device 24 is arranged to be in communication with a wireless transmitter 26 positioned in proximity to power source 12 so as to be within a communication range with wireless monitoring device 24. Wireless transmitter 26 is positioned adjacent to or on a welding consumable 28 that is to be used by welding apparatus 10 and is associated with that welding consumable 28. As shown in FIG. 1, welding consumable is in the form of a weld wire 28, but it is also envisioned that wireless transmitter could also be associated with other consumables typically used in a welding-type process (e.g., shielding gas). In one embodiment, wireless transmitter 26 is positioned on a reel or spool 30 (i.e., a consumable container) that holds the welding wire 28. An additional wireless transmitter 26 can also be positioned on, and associated with, workpiece 22. Wireless monitoring device 24 and wireless transmitters 26 communicate with each other by way of low frequency magnetic signals, thus conveying information back and forth regarding the welding consumable 28.

As defined with respect to the present invention, the low frequency magnetic signals transmitted between wireless monitoring device 24 and wireless transmitter 26 are emitted at between approximately 131-134 kHZ, and preferably at 131 kHz. The 131-134 kHz frequency is understood to be a signal that is in conformance with IEEE standard 1902.1, which is commonly referred to as RuBee™. (RuBee technology is available from Visible Assets, Inc., One, Datran Center, 9100 South Dadeland Blvd., Suite 106, Miami, Fla. 33156-7189.) The Rubee low frequency magnetic signal is predominantly comprised of magnetic waves (i.e., 99.9% magnetic waves) that are transmitted at a frequency of 131 kHZ, thus operating in the low-frequency band of the radio frequency (RF) spectrum. Accordingly, the present invention includes ranges of at least 90-100% magnetic signal to electrical signal with a preferred range of 98% to 99.9%. RuBee is a bidirectional, on-demand, peer-to-peer, radiating transceiver tag protocol that uses Long Wave (LW) magnetic signals to send and receive data packets in a local regional network. RuBee tags offer a real-time, tag-searchable protocol using IPv4 addresses and subnet addresses linked to asset taxonomies that run at speeds of 300 to 9,600 Baud.

The RuBee low frequency magnetic signal is differentiated from Radio-frequency identification (RFID) in that RFID works in a backscatter transponder mode and simply reflects the radio signal, whereas Rubee tags transmit their own signal predominantly by way of a magnetic field, H. RFID tags do not transmit an H signal or an E (electric field) signal, but rather, reflect a base-station carrier signal. As will be described in detail below, the RuBee protocol is implemented for wireless communication between wireless monitoring device 24 and wireless transmitter 26 to transfer data relevant to welding consumable 28 that can be implemented to assist in welding apparatus 10 setup and inventory monitoring of consumable 28.

Figure 2:
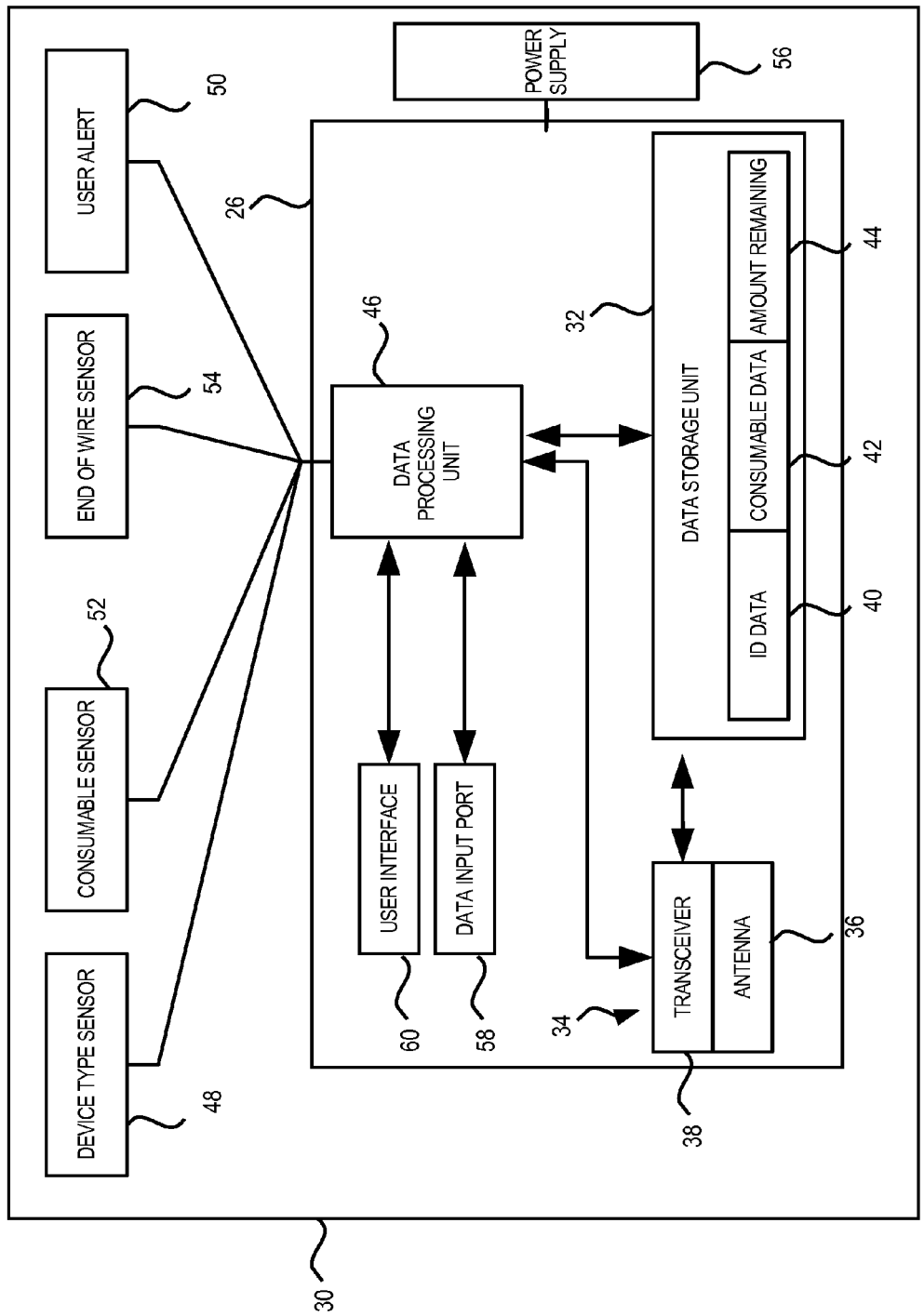
FIG. 2 is a schematic view of one embodiment of a wireless transmitter in accordance with the present invention.

Referring now to FIG. 2, a schematic view of wireless transmitter 26 is shown. Wireless transmitter is configured as a wireless tag 26 operable with a RuBee protocol and is affixed to a consumable container 30. For purposes of illustration, consumable container 30 will be described as a weld wire reel; however, it is understood that the features of the embodiment of FIG. 2 are not only equally applicable for use with wire drums, bulk packs, spools and the like, but also for use with other welding-type devices and accessories, such as shielding gas tanks and storage containers for other consumables. Wireless tag 26 is preferably attached directly to wire reel 30, though it is appreciated that proper placement of wireless tag 26 in, on, or near a consumable container will vary depending upon the type of container.

Wireless tag 26 includes a data storage unit 32 and a transmitter or wireless communication unit 34. Wireless communication unit 34, in turn, includes a tag antenna 36 and a transceiver 38 operatively connected to the tag antenna 36. Transceiver 38 is configured to emit and receive low frequency magnetic signals at a frequency of approximately 131 kHz. The transceiver 38 and data storage unit 32 are connected for bidirectional data transfer, as shown.

In a preferred embodiment, data storage unit 32 is a digital storage device capable of having several types of information stored thereon related to a consumable. In the embodiment shown, data storage unit 32 includes an identification number or code 40 unique to wireless tag 26. This ID number 40 is encoded in transmissions of wireless communication unit 34 to identify the source of the transmissions and, at minimum, includes an internet protocol (IP) address that identifies wireless tag 26. Data storage unit 32 also includes data 42 indicating the type of consumable material on the reel or other container 30 to which wireless tag 26 is connected. It is appreciated that consumable type data 42 may be as simple as a code indicating the general type of consumable of a container 30, such as a code indicating that the consumable is weld wire. Consumable type data 42 may also indicate such characteristic information as wire length, diameter, gauge, alloy type, or core type, flux characteristics, shielding gas type and pressure, various temperatures of interest, safety or MSDS information, particular welding instructions or ideal welding processes, and other similar characteristic information of welding-type consumables. This information may be used to match consumable containers with appropriate power sources or welding processes and to warn users or disable power sources when non-compatible consumables, equipment, or other welding-type devices are combined. In addition to consumable type data 42, data storage unit 32 also contains consumable amount data 44. That is, as will be explained in detail below, an amount of a consumable used in a welding-type process can be measured and compared with the original consumable data 42 to determine an amount of remaining consumable present in container 30. This remaining amount data 44 can then be stored in data storage unit 32.

In addition to the actual data 40, 42, 44 stored in data storage unit 32, data storage unit 32 may also be configured for rapid memory access, as when supplying a "real-time" data transfer. Regardless of real-time capability, data storage unit 32 should, at a minimum, be capable of providing identification information to wireless communication unit 34 for transmittal, such as a consumable type or consumable characteristics.

Wireless tag 26 also includes a micro-controller, or processing unit 46. Processing unit 46 is configured to decode and identify received messages transmitted via the RuBee protocol. If an appropriate response message is to be sent to wireless monitoring device 24 (shown in FIG. 1), based on some inquiry therefrom, processing unit 46 may request appropriate data from data storage unit 32, generate a data packet, and relay the message to wireless communication unit 34 for transmission. Alternatively, processing unit 46 may generate data packets for response messages containing information received directly from a plurality of sensors described here below, such information including, for example, an amount of remaining consumable. Therefore, processing unit 46 is bi-directionally connected to both wireless communication unit 34 and data storage unit 32.

Operably connected to data processing unit 46 are a number of sensors configured to acquire information related to a welding process. One such sensor is a device-type sensor 48 that can be used to detect what type of equipment the consumable container 30 is connected to, and can be used to inform attached equipment of the type of consumable contained therein. Thus, device-type sensor 48 may provide information for use in active monitoring of the compatibility of welding-type devices. For example, when wire reel 30 is attached to a welding system (not shown), device type sensor 48 detects which type of system the reel 30 is connected to via the low frequency magnetic signals of the RuBee protocol. The device type information may be encoded in a transmission of wireless communication unit 34 and sent to wireless monitoring device 24 (shown in FIG. 1). If the consumable type of the wire reel 30 and the particular welding system type are incompatible or at least not intended to be connected for the production process of that location, the wireless monitoring device and/or a welding apparatus controller, may issue a warning signal in response, causing activation of user alert 50 or disabling of the welding system.

Consumable sensor 52 and end of wire sensor 54 are used to provide more accurate and precise inventory monitoring. That is, a consumable container can detect via sensor 52 how much consumable is remaining therein, then continuously, periodically, or responsively update a monitoring device of such information. Sensor 52 will vary in construction in accordance with the type of consumable it is configured to detect. For example, sensor 52 could comprise a pressure gauge to measure shielding gas, a counter to measure linear feet of weld wire leaving a reel, a level sensor to monitor the drop in the level of wire on a reel or in a drum, or the like. The end of wire sensor 54 is adapted to automatically signal that the consumable wire in a container is gone or nearly gone. Preferably, sensor 54 is attached to the terminal end of a length of wire on a reel such that when the end of the wire is pulled from the reel, the sensor 54 is automatically disconnected from wireless tag 26 or broken, signaling to the data storage unit 32 and/or the processing unit 46 that no consumable remains. Alternatively, a sensor having a similar function may be integrated with a pressure gauge on a shielding gas tank, to signal when pressure is low.

Wireless tag 26 also includes a battery or other power source 56, and optionally a data input port 58, and/or a user interface 60. Battery 56 enables wireless tag 26 to operate in a powered transmission state, consistent with RuBee based communication. While the low frequency magnetic signals of the RuBee protocol transmitted by wireless tag 26 serve to extend life of battery 56 (as opposed to high frequency RFID transmissions), various battery management techniques may be employed to conserve power. For example, wireless tag 26 could operate in a low-power or "sleep" mode until receipt of a request signal, relay signal, or other signal which would necessitate a response or action of wireless tag 26. Alternatively, wireless tag 26 could be configured to only transmit or receive signals on an intermittent period, as opposed to receiving or transmitting signals at any time which could drain power.

Figure 3:
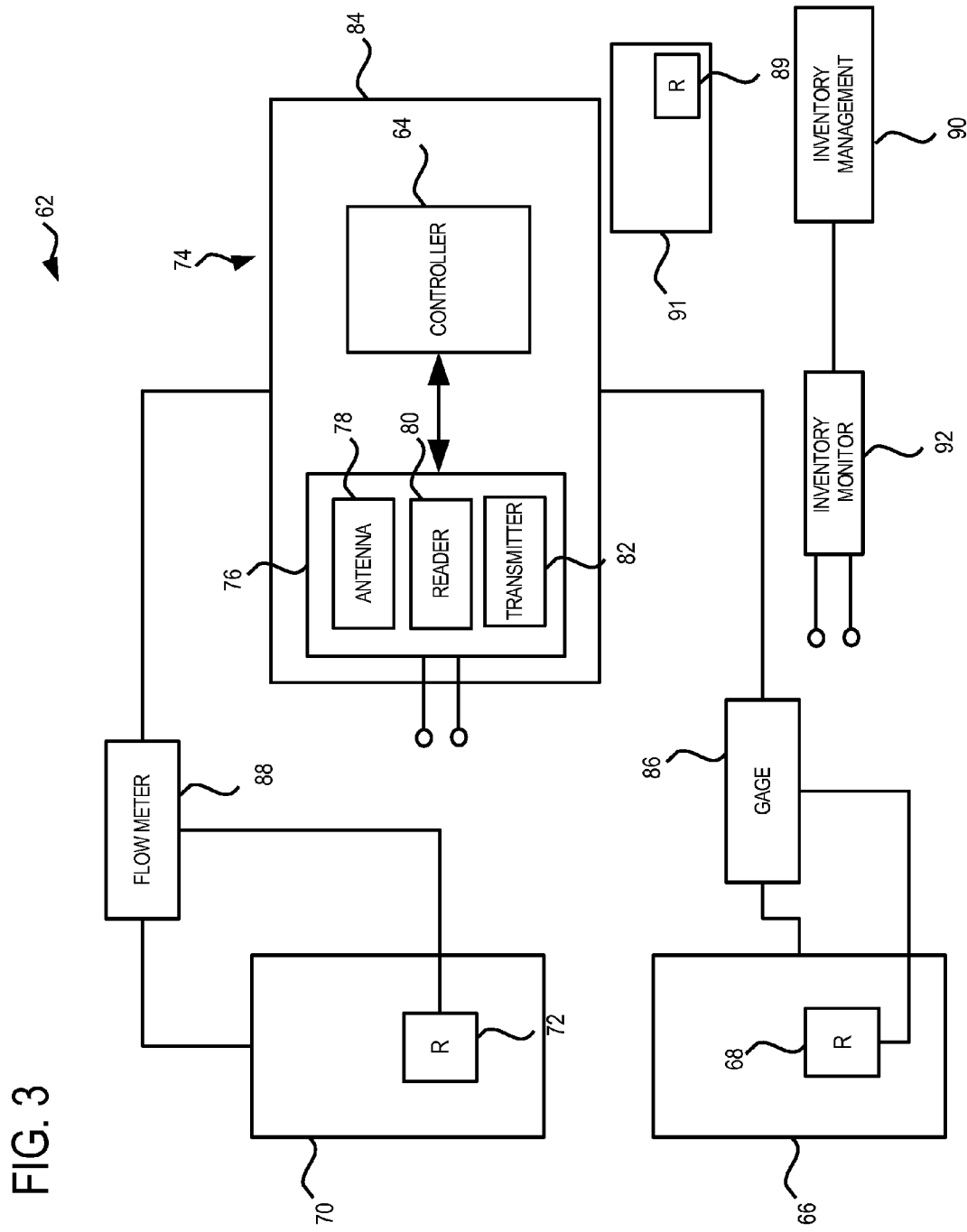
FIG. 3 is a schematic of a Rubee protocol based welding system in connection with controlling a welding process and monitoring consumption of welding consumables.

FIG. 3 schematically illustrates the use of RuBee tags in connection with controlling a welding process and maintaining an inventory of consumable usage in connection therewith. More particularly in this respect, FIG. 3 schematically illustrates a welding system 62 including a controller 64, a welding wire supply barrel 66 having a RuBee tag 68 thereon, a shielding gas tank 70 having a RuBee tag 72 mounted thereon, and a welding apparatus 74 to which the welding wire and gas are delivered in connection with performing the welding process. As set forth above, each of RuBee tags 68, 72 contains consumable specific information thereon, which as pertains to welding wire supply barrel 66 and shielding gas tank 70, can include such characteristic information as wire length, diameter, gauge, alloy type, or core type, flux characteristics, shielding gas type and pressure, various temperatures of interest, and other similar characteristic information of welding-type consumables.

Each of the Rubee tags 68, 72 communicates with a wireless monitoring device 76 via a 131 kHz signal to convey information regarding the welding wire and shielding gas, respectfully. The wireless monitoring device 76 includes a field antenna 78 configured to receive the low frequency magnetic signals emitted by RuBee tags 68, 72 and a reader 80 in operative communication with the field antenna 78 to receive the consumable specific data encoded in the low frequency magnetic signals. Wireless monitoring device 76 also includes a transmitter 82 in operative communication with the field antenna 78 that is configured to send data signals to the RuBee tags 68, 72.

In addition to being in wireless communication with RuBee tags 68, 72, wireless monitoring device 76 is also coupled to controller 64, which is positioned on or within a power source 84. Controller 64 is configured to set a plurality of operating parameters within power source 84 and select a desired operating mode for welding apparatus 74 based, at least in part, on detection of consumables and the specific characteristics thereof. Wireless monitoring device 76 receives data on the consumables contained in wire supply barrel 66 and gas tank 70 via wireless communication with RuBee tags 68, 72 and conveys the consumable data to controller 64. Based on the consumable data received, controller 64 sets and/or adjusts the operating parameters of power source 84. The appropriate operating parameters, such as current wave shape, welding wire feed speed, welding angle, arc current, arc voltage, current polarity, power, arc length, and shielding gas flow rate (among others), are preferably stored in a look-up table in volatile memory of controller 64. As such, a real-time determination of the appropriate operating parameters of the welding apparatus 84, specific to a particular consumable, may be determined and implemented.

The consumable specific data stored on RuBee tags 68, 72 can be extracted prior to use and/or in connection with use of the wire and/or shielding gas consumable in a given welding apparatus. When extracted prior to use, the information enables an operator to manually make the necessary preliminary adjustments to power source 84 (and other welding system components) by way of controller 64 for obtaining optimum performance from welding apparatus 74 and/or to select between two or more operating modes. With respect to consumable specific information pertaining to the wire diameter, for example, the diameter data can be extracted from RuBee tag 68 prior to initiating operation of the welding apparatus 74, thus enabling the operator to adjust parameters of the process so as to obtain a desired deposition rate in response to the wire diameter. With respect to the consumable specific information pertaining to the shielding gas, for example, the type of shielding gas and the pressure of the shielding gas can be encoded on RuBee tag 72, and the extracting of such information prior to initiating operation of the welding apparatus 74 enables the operator to adjust parameters of the process or to anticipate times in the process where a parameter such gas flow rate needs to be adjusted, so as to maintain a desired weld bead quality.

When the consumable specific information is transmitted from RuBee tags 68, 72 to wireless monitoring device 76 in connection with the operation of the welding apparatus 74 (i.e., during the welding process), the consumable information can be used to automatically configure welding apparatus 74. That is, consumable data received by controller 64 is used to automatically adjust an appropriate parameter or parameters for optimizing the apparatus performance, or to automatically switch between different operating modes of the apparatus, such as, for example, a spray arc mode or a pulsed arc welding mode. Such operating modes are given by way of example only, and many other modes of operation can be selected between depending on the particular welding apparatus and/or process with which the principals of the present invention are used. Likewise, the parameter of wire feed speed and shielding gas pressure are given by way of example only, and it will be appreciated that many other parameters can be controlled and/or adjusted using the principals of the present invention such as, arc voltage, arc current, power, arc length, wave shape, arc length or gap, to name but a few.

Referring still to FIG. 3, in one embodiment, a RuBee tag 89 is also positioned on, and associated with, a workpiece 91. RuBee tag 89 attached to workpiece 91 includes data stored thereon regarding a preferred welding process to be performed in relation to the workpiece. That is, RuBee tag 89 includes data thereon that specifies at least one of a desired welding wire feed speed, welding angle, arc current, arc voltage, current polarity, power, arc length, and a shielding gas flow rate to be used in the welding process. This workpiece data from Rubee tag 89 is transmitted to wireless monitoring device 76 and passed on to controller 64.

Upon receiving both consumable data from RuBee tags 68, 72 and workpiece data from RuBee tag 89, controller 64 is configured to compare the data and determine whether proper consumables are on hand for performing the welding process specified by data contained on RuBee tag 89, and corresponding to workpiece 91 or job packet. If the consumable on hand matches the requirements specified in the workpiece data stored on RuBee tag 89, then controller 64 allows welding apparatus 74 to perform the desired welding process. If, however, the available consumable on hand does not match the requirements specified in the workpiece data stored on RuBee tag 89, controller 64 does not allow welding apparatus 74 to perform the desired welding process (i.e., disables welding apparatus 74) and may set an alarm to alert a user of such a condition. Thus, efficient matching of a workpiece 91 to be welded and a proper consumable can be easily achieved by inclusion of RuBee tag 89 in conjunction with RuBee tags 68, 72.

As part of the consumable specific information stored thereon, RuBee tags 68, 72 include data thereon regarding the amount of weld wire on the spool 66 and the amount of gas initially in gas tank 70. Consumable amount sensors or devices 86, 88 are in electrical communication with RuBee tags 68, 72 to communicate thereto a rate of consumable consumption, thus allowing RuBee tags 68, 72 to process the consumption data and update for electronic storage therein, the amount of available consumable remaining. For example, a flow meter 88 is connected to tank 70 and is operable during the welding process to output a signal to RuBee tag 72 indicative of a gas flow rate and thus the quantity of gas used. Additionally, a counter gauge 86 configured to measure linear feet of weld wire leaving a container is connected to spool 66 and is operable during the welding process to output a signal to RuBee tag 68 indicative of a wire feed rate and thus the length of welding wire used.

RuBee tags 68, 72 process the consumption data provided by flow meter 88 and counter gauge 86 and update the consumable data stored on a memory device in the tag to reflect the amount of available shielding gas and weld wire remaining in/on the gas tank 70 and the spool 66 respectively. It is envisioned that this updated consumable data can then be transmitted by RuBee tags 68, 72 to wireless monitoring device 76 and controller 84, signaling that a consumable level is getting low. Thus, if appropriate, controller 84 may signal welding apparatus 74 to shut down if a consumable is about to run out.

It is also envisioned that the updated consumable data can be wirelessly transmitted by RuBee tags 68, 72 to an inventory control system 90. Inventory control system would include a wireless monitoring device 92 in communication with RuBee tags 68, 72. This wireless monitoring device 92 would receive data from the RuBee tags 68, 72 reflecting current quantities of gas and wire in the respective receptacles. This information would be transmitted to the inventory control system 90, with the information available therefrom visually such as on a television screen (not shown) and/or by a printout. Thus, facility operators could be alerted of an impending shortage of a welding consumable at a particular location and act to provide additional consumable at the location before a welding process is forced to be interrupted due to a lack of that consumable. Additionally, by monitoring the amount of consumable within multiple containers within a facility, inventory control system 90 can determine exactly how much consumable material is on hand. Thus, appropriate re-supply requests can be generated for a particular consumable and active on-site inventory management can be achieved.

In addition to providing consumable data and workpiece data, RuBee tags 68, 72, 89 can be used to track the shipment of the consumables (and consumable containers) and workpieces from a manufacturer or storage facility to a welder. This type of tracking provides information to the user concerning available inventory that can be used for a welding operation and/or the location or date of arrival of new inventory for a welding operation. Such inventory tracking can be used to ensure that needed consumables are readily available for used for a particular welding operation in a particular location.

Therefore, according to one embodiment of the present invention, a welding-type system includes a power source to produce a welding-type power, the power source being operable in a plurality of operating modes. The welding-type system also includes a controller configured to set a plurality of operating parameters within the power source, at least one wireless monitoring device coupled to the controller, and at least one welding-type consumable associated with a wireless transmitter, the wireless transmitter configured to emit low frequency magnetic signals having consumable data encoded therein indicative of the at least one welding-type consumable. The at least one wireless monitoring device is arranged to communicate with the wireless transmitter by receiving and transmitting the low frequency magnetic signals, with the low frequency magnetic signals being transmitted at a frequency of approximately 131 kHz.

According to another embodiment of the present invention, a wireless communication welding-type system includes a power source to produce a welding-type power, a controller configured to set a plurality of operating parameters within the power source, and at least one wireless monitoring device coupled to the controller. The wireless communication welding-type system also includes a wireless transceiver tag in communication with the at least one wireless monitoring device, the wireless transceiver tag associated with a welding-type consumable and configured to communicate with the at least one wireless monitoring device by way of a bidirectional, on-demand, peer-to-peer protocol transmitted via substantially magnetic waves emitted at a frequency of approximately 131 kHz. The protocol includes consumable data encoded therein indicative of the welding-type consumable.

According to yet another embodiment of the present invention, a method for controlling a welding-type process having a plurality of operating conditions includes the steps of providing a consumable to be used in a welding-type process and positioning a wireless tag in proximity to the consumable and associating the wireless tag with the consumable, the wireless tag having a memory to store consumable data regarding parameters of the consumable. The method also includes the steps of reading the consumable data from the wireless tag from a wireless monitoring device, transmitting the consumable data from the wireless tag to the wireless monitoring device by way of a low frequency magnetic signal transmitted at a frequency of approximately 131 kHz, and controlling a welding-type device by setting the plurality of operating parameters, the setting of the plurality of operating parameters being determined by the transmitted consumable data.

According to still a further embodiment of the present invention, a method for monitoring an inventory of consumables in conjunction with performing a welding-type process includes the steps of providing a consumable to be used in a welding-type process and positioning a wireless tag in proximity to the consumable and associating the wireless tag with the consumable, the wireless tag having a memory to store data on an available quantity of the consumable. The method also includes the steps of measuring the quantity of consumable consumption during performance of the welding-type process, electronically modifying the memory of the wireless tag to reflect an updated available quantity of the consumable, and transmitting a data signal to a wireless monitoring device on an on-demand basis. The data signal includes data therein on the updated available quantity of the consumable and substantially comprises magnetic waves being transmitted at a frequency of approximately 131 kHz.

The present invention has been described in terms of the preferred embodiment, and it is recognized that equivalents, alternatives, and modifications, aside from those expressly stated, are possible and within the scope of the appending claims.

What is claimed is:

1. A welding-type system comprising:
a power source to produce a welding-type power, the power source being operable in a plurality of operating modes;
a controller configured to set a plurality of operating parameters within the power source;
at least one wireless monitoring device coupled to the controller;
at least one welding-type consumable container holding at least one welding-type consumable, the container having a wireless transmitter supported thereon, the wireless transmitter having a dedicated power supply and being configured to emit low frequency magnetic signals having consumable data encoded therein indicative of the at least one welding-type consumable; and
wherein the at least one wireless monitoring device is arranged to communicate with the wireless transmitter by receiving and transmitting the low frequency magnetic signals, the low frequency magnetic signals being transmitted at a frequency of approximately 131 kHz.

2. The welding-type system of claim 1 wherein the at least one wireless monitoring device is configured to communicate with the controller and transmit the consumable data in the received low frequency magnetic signals thereto.

3. The welding-type system of claim 1 wherein the controller is configured to set one or more of the plurality of operating parameters within the power source based on the consumable data transmitted thereto by the wireless monitoring device.

4. The welding-type system of claim 1 wherein controller is configured to select one of the plurality of operating modes for operating the power source based on the consumable data transmitted thereto by the wireless monitoring device.

5. The welding-type system of claim 1 wherein the plurality of operating parameters comprises at least one of a current wave shape, a welding wire feed speed, a welding angle, an arc current, an arc voltage, a current polarity, power, arc length, and a shielding gas flow rate.

6. The welding-type system of claim 1 wherein the wireless transmitter further comprises a wireless tag including:
a tag antenna;
a transceiver operatively connected to the tag antenna and configured to emit and receive low frequency magnetic signals;
a data storage device operable to store the consumable data thereon and identification data to identify the wireless transmitter;
a programmed data processor configured to process data received from the transceiver and the data storage device, and to send data to cause the transceiver to emit at least one of an identification signal based upon the identification data stored and a consumable signal based upon the consumable data stored; and
an energy source for activating the transceiver and the data processor.

7. The welding-type system of claim 6 wherein the consumable data comprises a type and an amount of the at least one welding-type consumable.

8. The welding-type system of claim 7 further comprising a consumable amount sensor configured to measure a quantity of consumption of the at least one welding-type consumable during performance of a welding operation and relay a signal to the wireless tag to modify the consumable data on the data storage device to reflect a remaining quantity of the at least one welding-type consumable.

9. The welding-type system of claim 1 wherein the at least one wireless monitoring device further comprises:
a field antenna configured to receive the low frequency magnetic signals emitted by the wireless transmitter;
a reader in operative communication with the field antenna to receive the data encoded in the low frequency magnetic signals; and
a transmitter in operation communication with the field antenna, the transmitter configured to send data signals to the wireless transmitter.

10. The welding-type system of claim 1 wherein the low frequency magnetic signals comprise a bidirectional, on-demand, peer-to-peer, radiating transceiver tag protocol.

11. The welding-type system of claim 1 further comprising a wireless workpiece transmitter associated with a workpiece to be welded, the wireless workpiece transmitter configured to store data thereon related to a desired plurality of operating parameters for welding the workpiece.

12. A wireless communication welding-type system comprising:
a power source to produce a welding-type power;
a controller configured to set a plurality of operating parameters within the power source;
at least one wireless monitoring device coupled to the controller;
a wireless transceiver tag in communication with the at least one wireless monitoring device, the wireless transceiver tag having a dedicated power supply and being supported by a container holding at least one welding-type consumable, wherein the wireless transceiver tag is configured to communicate with the at least one wireless monitoring device by way of a bidirectional, on-demand, peer-to-peer protocol transmitted via substantially magnetic waves emitted at a frequency of approximately 131 kHz; and
wherein the protocol includes consumable data encoded therein indicative of the welding-type consumable.

13. The wireless communication welding-type system of claim 12 wherein the controller is configured to set one or more of the plurality of operating parameters within the power source based on the consumable data that is transmitted thereto by the wireless monitoring device.

14. The wireless communication welding-type system of claim 12 wherein the wireless transceiver tag further comprises a data storage device configured to store the consumable data thereon, the consumable data comprising at least an amount of the consumable.

15. The wireless communication welding-type system of claim 14 wherein the data storage device comprises a writeable memory, and wherein an updated amount of the consumable is written thereto based on a measured consumption of the consumable.

16. A method of controlling a welding-type process having a plurality of operating conditions comprising the steps of:
providing a consumable to be used in a welding-type process;
positioning a wireless tag in proximity to the consumable and supporting the wireless tag on a container holding at least one consumable, the wireless tag having a dedicated power supply and a memory to store consumable data regarding parameters of the consumable;
reading the consumable data from the wireless tag from a wireless monitoring device;
transmitting the consumable data from the wireless tag to the wireless monitoring device by way of a low frequency magnetic signal transmitted at a frequency of approximately 131 kHz; and controlling a welding-type device by setting the plurality of operating parameters, the setting of the plurality of operating parameters being determined by the transmitted consumable data.

17. The method of claim 16 wherein the step of controlling the welding-type device further comprises selecting one of a plurality of operating modes for operating the welding-type device based on the transmitted consumable data.

18. The method of claim 16 wherein the low frequency magnetic signal is a bidirectional, on-demand, peer-to-peer, radiating transceiver tag protocol.

19. A method for monitoring an inventory of consumables in conjunction with performing a welding-type process including the steps of:
   providing a consumable to be used in a welding-type process;
   positioning a wireless tag in proximity to the consumable and supporting the wireless tag on a container holding at least one consumable, the wireless tag having a dedicated power supply and a memory to store data on an available quantity of the consumable;
   measuring the quantity of consumable consumption during performance of the welding-type process;
   electronically modifying the memory of the wireless tag to reflect an updated available quantity of the consumable;
   transmitting a data signal to a wireless monitoring device on an on-demand basis, the data signal including data therein on the updated available quantity of the consumable; and
   wherein the data signal substantially comprises magnetic waves being transmitted at a frequency of approximately 131 kHz.

20. The method of claim 19 wherein the step of positioning further comprises positioning the wireless electronic control on a consumable container housing the consumable.

21. The method of claim 19 further comprising the step of generating a re-supply order for the consumable when the available quantity of the consumable reaches a designated level determined by at least one of user setting, pas re-supply levels, rate of usage, and estimated requirements.

22. The method of claim 19 wherein the data signal is a bidirectional, on-demand, peer-to-peer, radiating transceiver tag protocol.

23. A method for monitoring an inventory of consumables in conjunction with performing a welding-type process including the steps of:
   providing a consumable to be used in a welding-type process;
   positioning a wireless tag in proximity to the consumable and supporting the wireless tag on a container holding at least one consumable, the wireless tag having a dedicated power supply and a memory to store data on an available quantity of the consumable;
   determining a location of the consumable; and
   wherein the data signal substantially comprises magnetic waves being transmitted at a frequency of approximately 131 kHz.

* * * * *